(12) United States Patent
Fowler et al.

(10) Patent No.: US 8,914,897 B2
(45) Date of Patent: *Dec. 16, 2014

(54) CONTROLLING ACCESS TO DIGITAL IMAGES BASED ON DEVICE PROXIMITY

(75) Inventors: David Keith Fowler, Hastings, MN (US); Zachary Adam Garbow, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1546 days.

This patent is subject to a terminal disclaimer.

(21) Appl. No.: 11/752,378

(22) Filed: May 23, 2007

(65) Prior Publication Data

US 2008/0294774 A1 Nov. 27, 2008

(51) Int. Cl.

| | |
|---|---|
| H04L 29/06 | (2006.01) |
| H04N 21/4363 | (2011.01) |
| H04N 21/45 | (2011.01) |
| H04N 21/4627 | (2011.01) |
| H04W 4/02 | (2009.01) |
| H04L 29/08 | (2006.01) |
| G06F 21/35 | (2013.01) |
| H04N 21/4223 | (2011.01) |
| G06F 21/62 | (2013.01) |
| H04N 21/414 | (2011.01) |
| H04N 21/2743 | (2011.01) |
| H04N 7/173 | (2011.01) |
| H04W 48/04 | (2009.01) |
| H04W 64/00 | (2009.01) |

(52) U.S. Cl.
CPC ........ *H04N 7/173* (2013.01); *G06F 2221/2141* (2013.01); *G06F 2221/2111* (2013.01); *H04N 21/43637* (2013.01); *H04N 21/4524* (2013.01); *H04N 21/4627* (2013.01); *H04W 4/02* (2013.01); *H04L 63/101* (2013.01); *H04W 48/04* (2013.01); *H04L 67/18* (2013.01); *H04W 64/006* (2013.01); *G06F 21/35* (2013.01); *G06F 2221/2129* (2013.01); *H04N 21/4223* (2013.01); *G06F 21/6218* (2013.01); *H04N 21/41407* (2013.01); *H04N 21/2743* (2013.01)

USPC ............................................. 726/27; 726/28

(58) Field of Classification Search
USPC ........................................... 726/1, 21, 27–29
See application file for complete search history.

(56) References Cited

U.S. PATENT DOCUMENTS

| 6,018,774 A | 1/2000 | Mayle et al. |
| 6,396,537 B1 | 5/2002 | Squilla et al. |

(Continued)

FOREIGN PATENT DOCUMENTS

| EP | 1545129 A1 | 6/2005 |
| EP | 1619838 A1 | 1/2006 |

(Continued)

OTHER PUBLICATIONS

Pering, Trevor et al, "Face-to-Face Media Sharing Using Wireless Mobile Devices", Proceedings of the Seventh IEEE International Symposium on Multimedia (ISM'05), Mar. 2005.

(Continued)

*Primary Examiner* — Joseph P. Hirl
*Assistant Examiner* — Chi Nguy
(74) *Attorney, Agent, or Firm* — Patterson & Sheridan, LLP

(57) ABSTRACT

Embodiments of the invention provide techniques for controlling access to digital images based physical and temporal proximity to the image capture event. In one embodiment, an imaging device capturing a digital image broadcasts an invitation to wireless devices in the surrounding area. The wireless devices respond with an acceptance, including the email address (or some other network address) of the device owner. The digital image is made available at a network location with restricted access. Access to the image is controlled with an access list based on the acceptances received by the imaging device.

34 Claims, 4 Drawing Sheets

(56) References Cited

U.S. PATENT DOCUMENTS

| | | |
|---|---|---|
| 6,542,936 B1 | 4/2003 | Mayle et al. |
| 6,591,068 B1 | 7/2003 | Dietz |
| 6,871,231 B2 | 3/2005 | Morris |
| 6,907,225 B1 | 6/2005 | Wilkinson |
| 6,999,112 B2 | 2/2006 | Seaman et al. |
| 7,035,440 B2 | 4/2006 | Kaku |
| 7,336,928 B2 * | 2/2008 | Paalasmaa et al. ........... 455/41.2 |
| 7,639,279 B2 | 12/2009 | Shinohara et al. |
| 7,643,658 B2 | 1/2010 | Kilner et al. |
| 7,966,223 B2 | 6/2011 | David |
| 2001/0034648 A1 | 10/2001 | Caldwell |
| 2002/0164987 A1 | 11/2002 | Caronni et al. |
| 2003/0103149 A1 | 6/2003 | Kinjo et al. |
| 2003/0182143 A1 | 9/2003 | Conrad et al. |
| 2004/0230663 A1 * | 11/2004 | Ackerman .................... 709/207 |
| 2005/0052685 A1 * | 3/2005 | Herf et al. .................... 358/1.15 |
| 2005/0104976 A1 | 5/2005 | Currans |
| 2006/0002317 A1 * | 1/2006 | Punaganti Venkata ....... 370/310 |
| 2006/0009155 A1 | 1/2006 | Paalasmaa et al. |
| 2006/0044599 A1 | 3/2006 | Lipowitz et al. |
| 2006/0046700 A1 * | 3/2006 | Anderson ................... 455/414.1 |
| 2006/0182045 A1 * | 8/2006 | Anderson ...................... 370/260 |
| 2007/0067297 A1 | 3/2007 | Kublickis |
| 2007/0105497 A1 | 5/2007 | Ritala |
| 2007/0162971 A1 * | 7/2007 | Blom et al. ...................... 726/17 |
| 2007/0236505 A1 * | 10/2007 | Jung et al. ...................... 345/589 |
| 2008/0176514 A1 * | 7/2008 | Nadas ........................... 455/41.2 |
| 2008/0294548 A1 | 11/2008 | Fowler et al. |
| 2009/0186575 A1 * | 7/2009 | Cedo Perpinya et al. .... 455/41.2 |
| 2010/0222107 A1 * | 9/2010 | Wassingbo ..................... 455/566 |

FOREIGN PATENT DOCUMENTS

| | | |
|---|---|---|
| JP | 2005293513 A | 10/2005 |
| WO | 03033209 A2 | 4/2003 |
| WO | 2005060254 A1 | 6/2005 |
| WO | 2006056881 A1 | 6/2006 |

OTHER PUBLICATIONS

Ronnholm, Valter—"Push-to-Talk Over Bluetooth", Proceedings of the 39th Hawaiii International Conference on System Sciences, May 2006, pp. 1-10.

Office Action History of U.S. Appl. No. 11/752,390, dates ranging from Mar. 12, 2010 to Jun. 3, 2010.

"Bluetooth Communication Topology," Bluetooth SIG, Inc., Mar. 2007, <http://web.archive.org/web/20070308132238/www.bluetooth.com/Bluetooth/Learn/Works/Communications_Topology.htm> [copy retrieved Nov. 1, 2010].

Final Office Action of U.S. Appl. No. 11/752,390 dated Oct. 21, 2010.

* cited by examiner

CONTROLLING ACCESS TO DIGITAL IMAGES BASED ON DEVICE PROXIMITY

CROSS-REFERENCE TO RELATED APPLICATIONS

This application is related to U.S. patent application Ser. No. 11/752,390, entitled FEE-BASED DISTRIBUTION OF MEDIA BASED ON DEVICE PROXIMITY, filed May 23, 2007, by Fowler et al. This related patent application is herein incorporated by reference in its entirety.

BACKGROUND OF THE INVENTION

1. Field of the Invention

The invention relates to data processing. More specifically, the invention relates to controlling access to digital images based on device proximity.

2. Description of the Related Art

The technologies of digital cameras and the Internet have been widely adopted by consumers. As a result, there is a growing demand for the sharing of digital photographs and video (hereafter referred to as "digital images"). One solution is provided by websites that host digital images, such as Flickr®, Snapfish®, Yahoo Photos®, and the like. Many image hosting websites enable a user to define an access list, which specifies the people who are authorized to view a particular group of digital images.

Typically, the user creates an access list by manually inputting the people who are authorized to access the digital images. Once the digital images are posted on the website, people on the access list may access the digital images from the website. However, this process is not always a practical method of creating an access list. In some situations (e.g., weddings, parties, public events, etc.), there may be a large number of people who may wish to access the digital images. In such situations, the manual input method of creating an access list is often labor-intensive and inefficient.

Therefore, there is a need in the art for techniques for controlling access to digital images.

SUMMARY OF THE INVENTION

The present invention generally relates to data processing. More specifically, the invention relates to controlling access to digital images based on device proximity.

One embodiment provides a method of generating an access list for controlling access to an image, comprising: in response to capturing the image on an image capture device, sending a wireless invitation signal from the image capture device; receiving, by the image capture device, at least one response signal from at least one responding device indicating that the respective responding device received the wireless invitation signal, wherein the respective response signals includes respective identifiers corresponding to the respective responding device; and generating, by the image capture device, an access list corresponding to the image, wherein the access list is composed according to the respective identifiers contained in the respective response signals received by the image capture device, thereby limiting users permitted to access the image to those associated with the respective responding devices.

Another embodiment provides a computer readable medium containing a program, which, when executed, performs an operation, comprising: in response to capturing the image on an image capture device, sending a wireless invitation signal from the image capture device; receiving, by the image capture device, at least one response signal from at least one responding device indicating that the respective responding device received the wireless invitation signal, wherein the respective response signals includes respective identifiers corresponding to the respective responding device; and generating, by the image capture device, an access list corresponding to the image, wherein the access list is composed according to the respective identifiers contained in the respective response signals received by the image capture device, thereby limiting users permitted to access the image to those associated with the respective responding devices.

Yet another embodiment provides a system, comprising an image capture device configured to: in response to capturing an image, send a wireless invitation signal; receive at least one response signal from at least one responding device indicating that the respective responding device received the wireless invitation signal, wherein the respective response signals includes respective identifiers corresponding to the respective responding device; and generate an access list corresponding to the image, wherein the access list is composed according to the respective identifiers contained in the respective response signals received by the image capture device, thereby limiting users permitted to access the image to those associated with the respective responding devices. The system further comprises a computing device configured to control access to the image based on the access list.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
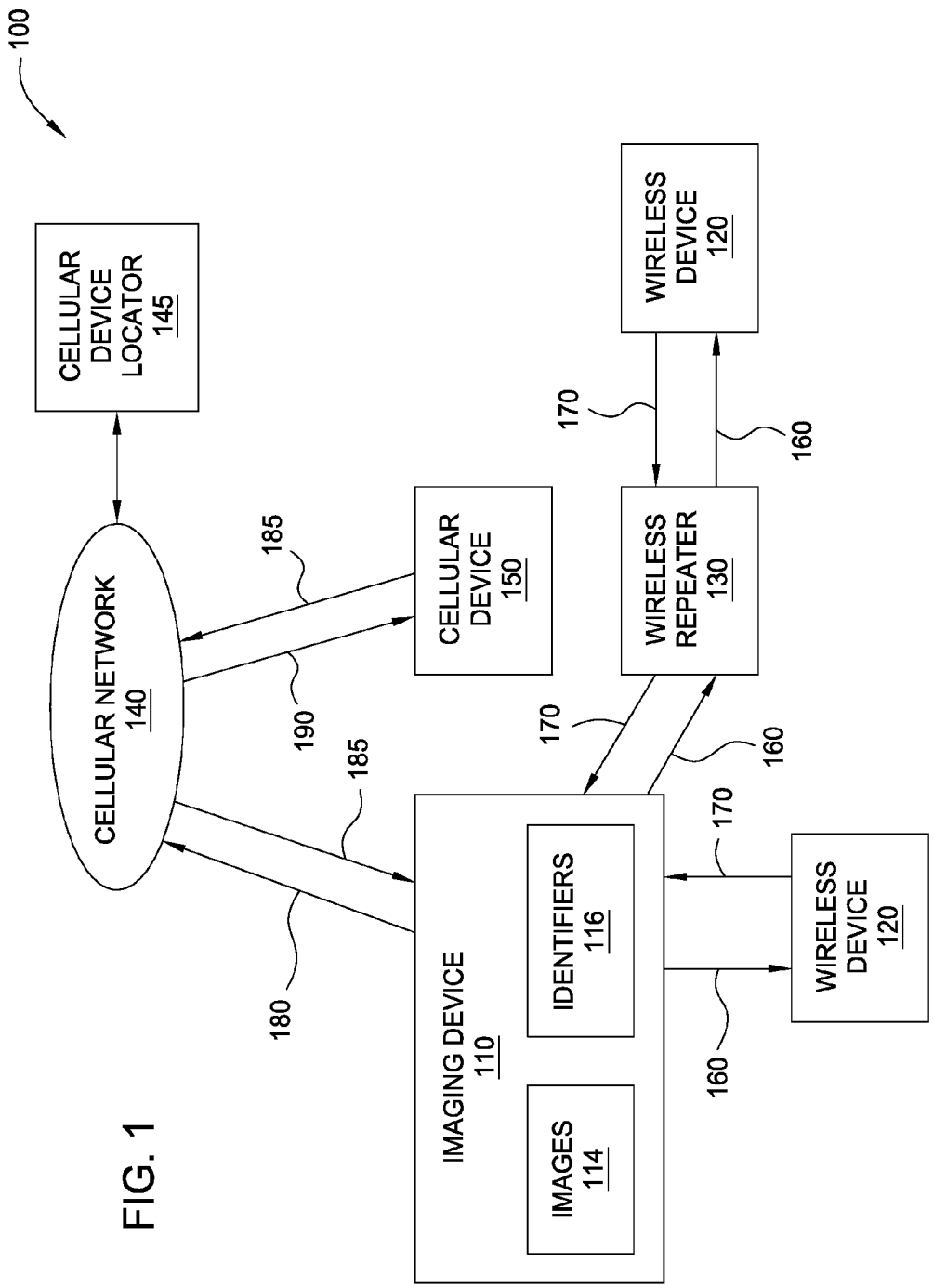
FIG. 1 is a block diagram illustrating a computing and data communications environment, according to one embodiment of the invention.

Embodiments of the invention provide techniques for controlling access to digital images based physical and temporal proximity to the image capture event. In one embodiment, an imaging device capturing a digital image broadcasts an invitation to wireless devices in the surrounding area. The wireless devices respond with an acceptance, including the email address (or some other network address) of the device owner. The digital image is made available at a network location with restricted access. Access to the image is controlled with an access list based on the acceptances received by the imaging device.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a computing and data communications environment 100, according to one embodiment of the invention. As shown, the environment 100 includes an imaging device 110, wireless devices 120, a wireless repeater 130, a cellular network 140, and a cellular device 150. The imaging device 110 includes a set of images 114 and a set of identifiers 116. Illustratively, the imaging device 110 may be any device for capturing digital images, such as a digital camera, a video camcorder, or a cellular telephone equipped with a camera.

In one embodiment, the imaging device 110 is configured to send an invitation signal 160 and to receive a response signal 170. The invitation signal 160 includes an invitation for other people to be provided access to an image (e.g., one of the images 114 captured by the imaging device 110) once it is placed in a shared location, such as a hosting web site. In one embodiment, the invitation signal 160 includes an invitation message and a network identifier for the imaging device 110. The invitation message may be configured in a variety of techniques. For example, the invitation message may be formatted in plain text or in Extensible Markup Language (XML). In addition, the invitation signal 160 may include any other relevant information, such as the type of imaging device (e.g., camera, video recorder, cellular telephone, etc.), the quality of the image (e.g., resolution, aspect ratio, bit rate, etc.), a description of the content of the image (e.g., "People," "Scenery," etc.), a time stamp for the image capture, and the like. In one embodiment, the invitation signal 160 may be sent after an image is captured and added to the set of images 114. In another embodiment, the invitation signal 160 could be sent periodically (e.g., once every five minutes). In yet another embodiment, the invitation signal 160 could be sent whenever the user of the imaging device 110 manually triggers an invitation (e.g., by activating a manual control). The invitation signal 160 may correspond to a single image or to a group of images.

In one embodiment, the invitation signal 160 is broadcast generally, and can be received by any wireless devices 120 that are within range of the transmission. Alternatively, the invitation signal 160 may only be addressed to a pre-selected list of devices. The pre-selected list of devices could be loaded onto the imaging device 110, and may limit the invitations to, for example, the friends of the imaging device owner. The imaging device 110 may include profiles to classify the types of images being captured and to specify which people may be invited to share each type of image. For example, a "Family" profile may be used to classify images of family members, and the corresponding invitations could be restricted to devices belonging to family members. Another profile named "Scenery" may be used to classify images that do not include people, and the corresponding invitations signals 160 could be broadcast to any devices in range. In one embodiment, the profiles can be manually selected on the imaging device 110 prior to the image capture. Alternatively, the imaging device 110 may include a component configured to recognize human faces in an image, according to techniques known in the art (e.g., pattern recognition techniques). If any human faces are detected in an image, the image may be automatically assigned an appropriate profile, for example "People." In one embodiment, where the signal is sent to selective users/devices, the signal may include a password. The password is used to access a media hosting computer, such as the server computing device 220 described in more detail below.

In one embodiment, the wireless devices 120 can be configured to alert the user to the receipt of an invitation signal 160, to present the user with the option for accepting the invitation, and to transmit a response signal 170 back to the imaging device 110. The wireless devices 120 may also incorporate profiles to classify any incoming invitation signals 160, including rules for how to handle each profile. The profile rules could specify whether to automatically accept or reject an invitation, and thus not require any intervention by the user. The profile rules can be based on the source of the invitation (e.g., only accept invitations from designated friends), or may be based on other information included in the invitation (e.g., only accept invitations for images of people, only accept high-resolution images, do not accept images taken with cellular telephone cameras, etc.).

In the case that the invitation is accepted, the wireless device 120 issues a response signal 170. The response signal 170 includes an identifier unique to the user of the wireless device 120. In one embodiment, the identifier is the email address of the user. The response signals 170 are received by the imaging device 110. The identifiers included in the response signals 170 can then be added to the set of identifiers 116, which are stored in the imaging device 110. Each identifier 116 may be configured to reference, for example, a specific invitation signal 160, a specific image 114, a group of images 114, and/or a particular period of time. The imaging device 110 can be configured to apply rules to the received response signals 170. For example, the imaging device 110 may include a rule to only store identifiers for a pre-selected list of friends. When the set of images 114 is uploaded from the imaging device 110 to a hosting web site, the set of identifiers 116 is also uploaded. The uploaded identifiers are used to construct an access list. Thereafter, the people included in the access list are notified (e.g., by email), and are authorized to access the images.

The wireless devices 120 could include any device configured to receive and respond to an invitation signal, including cellular telephones, portable computers, cameras, etc. It may also be useful to construct devices having the sole purpose of responding to invitation signals 160. Such single-purpose devices could be configured in a small and unobtrusive form, for example a key chain fob.

In some situations, a person may wish to send a request for images to owners of imaging devices. Such situations may include, for example, a person who does not have an imaging device, or a person who may want images captured by higher-quality imaging devices, by more skilled photographers, or from a better vantage point. Thus, rather than waiting for an invitation signal 160 to be sent by the imaging device 110, the user of the wireless device 120 may wish to proactively ask others to capture images on his behalf. In one embodiment, a wireless device 120 (the "requesting wireless device") could be configured to broadcast a request signal (not shown) to any imaging devices 110 (the "requested imaging device(s)") in the area. The request signal includes an identifier, similar to the identifier included in a response signal 170. When received, the request signal could cause the requested imaging device 110 to display a message requesting images. The request message could comprise a display of a text message, a warning light, an auditory alert, or some other notification scheme. The owner of the requested imaging device, upon receiving a request message, can decide whether to fulfill the request. If the owner decides to fulfill the request, the requested imaging device 110 may add the identifier contained in the request signal to the set of identifiers 116. As a result, the user of the requesting wireless device 120 is added to the access list for the images.

In one embodiment, the signals 160, 170 are short-range wireless signals, such as those that conform to the Bluetooth wireless network protocol. By virtue of using a short-range wireless signal, the invitation signal 160 is only received by wireless devices 120 in proximity of the imaging device 110. Thus, the invitation signal 160 is only received by those people who are most likely to be interested in receiving the digital image, namely, the people who are in the same area at the same time as the image is captured.

In some situations, it may be useful to extend the invitation signal 160 to a greater range than that afforded by a short-range wireless signal. This extension can be performed by use of a wireless repeater 130, according to one embodiment. The wireless repeater 130 illustrates a device that is configured to repeat (i.e., receive and transmit forward) the invitation signal 160 to other wireless devices, as well as to repeat any response signals 170 back to the imaging device 110. Thus, the wireless repeater 130 may serve to extend the range of the invitation signal 160. The wireless repeater 130 could also serve as a wireless device 120. That is, the wireless repeater 130 can function to accept an invitation signal 160, as well as repeat the signal for other wireless devices 120 that were not in range of the original signal. However, if the invitation signal 160 is received and repeated by several wireless repeaters 130, it could be repeated too many times, and thus be propagated to a range that is too large to be useful. If so, the people receiving the invitation signal 160 may no longer be in the same area as the imaging device 110, and thus may not be interested in having access to the shared image. To avoid this situation, the imaging device 110 could be configured to enable the user to specify the maximum number of times that an invitation signal 160 can be repeated.

In some cases, a person present when an image is captured may wish to access the image, but may not be carrying a wireless device capable of responding to a broadcast invitation signal 160. To address this situation, a wireless device 120 may be configured to enable the device owner to accept an invitation on behalf of another person. More specifically, the owner of a wireless device 120 could enter or store more than one identifier in the device. Such a wireless device 120 could thereafter respond to a single invitation signal 160 with a plurality of response signals 170, each including a different identifier. By way of this technique, a person who is not carrying a wireless device 120 can still be added to an access list for viewing digital images.

In another embodiment, invitation and response signals are cellular telephone messages, rather than short-range wireless signals. As shown, the imaging device 110 sends an invitation message in a cellular invitation message 180, which is received by the cellular network 140. The cellular invitation message 180 may be a Short Message Service (SMS) text message, or any other cellular telephone protocol. The location of the imaging device 110 is determined by techniques known in the art. In one approach, the imaging device 110 includes a Global Positioning System (GPS) component (not shown), which is configured to include the location of the imaging device 110 in the cellular invitation message 180. In another approach, the location of the imaging device 110 is determined by triangulating the cellular invitation message 180 from cellular transmission towers (not shown). The location of the imaging device 110 is determined by the cellular device locator 145, which can then determine any cellular devices 150 in the vicinity of the imaging device 110. A secondary invitation message 190 can then be sent to the nearby cellular devices 150. If the invitation is accepted, the accepting cellular device 150 sends a cellular response message 185 to the imaging device 110. As with the wireless devices 120, the cellular device 150 can be configured to send a response automatically, or the response can be manually triggered by the user. Similarly to the response signals 170, the cellular response messages 185 include identifiers which can be added to the set of identifiers 116 stored in the imaging device 110. The identifiers can be filtered, and are thereafter utilized to construct an access list in the same manner as described above for the response signals 170.

Figure 2A:
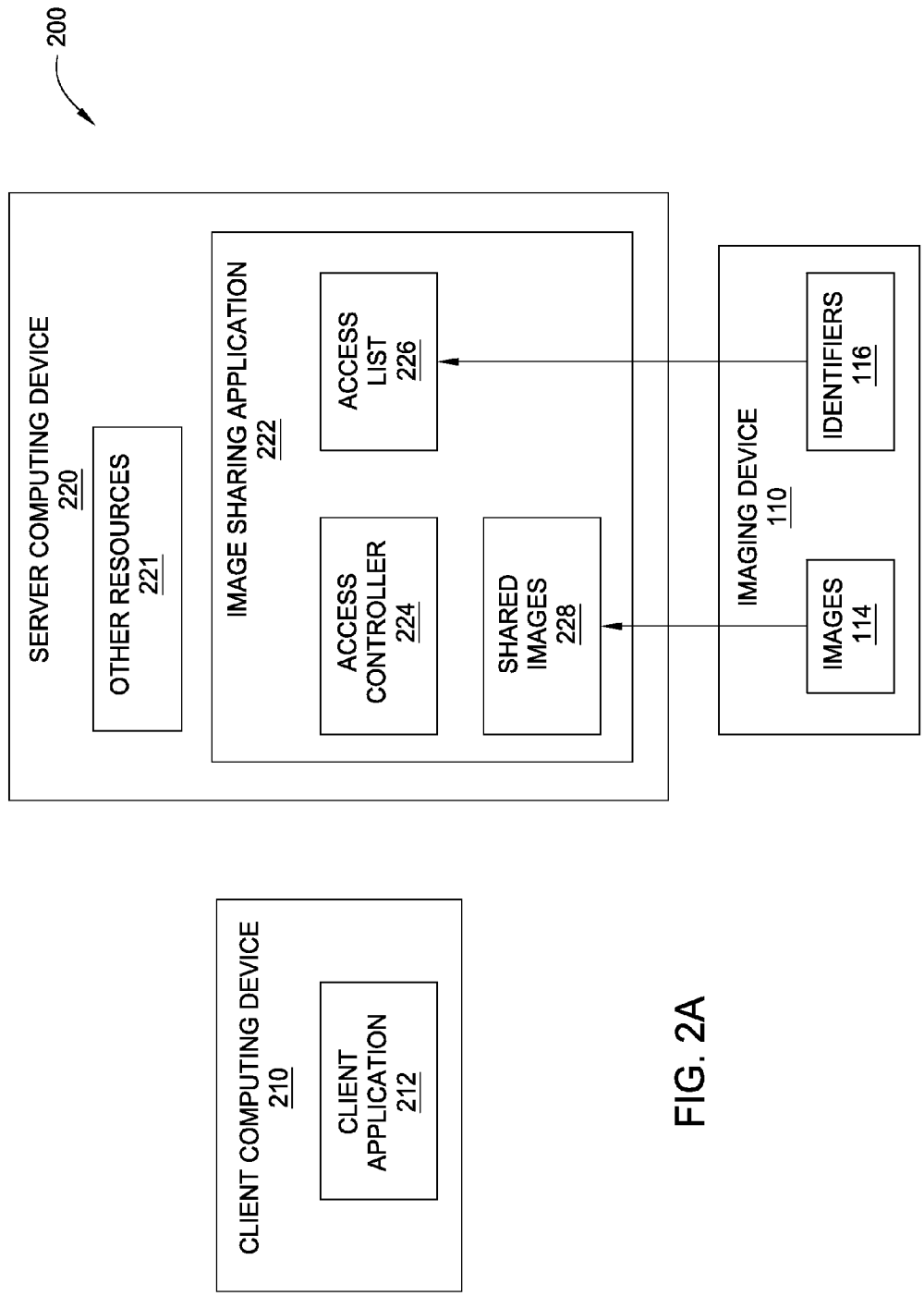
FIGS. 2A-2B illustrate a block diagram of a computing system for controlling access to digital images, according to one embodiment of the invention.
Figure 2B:
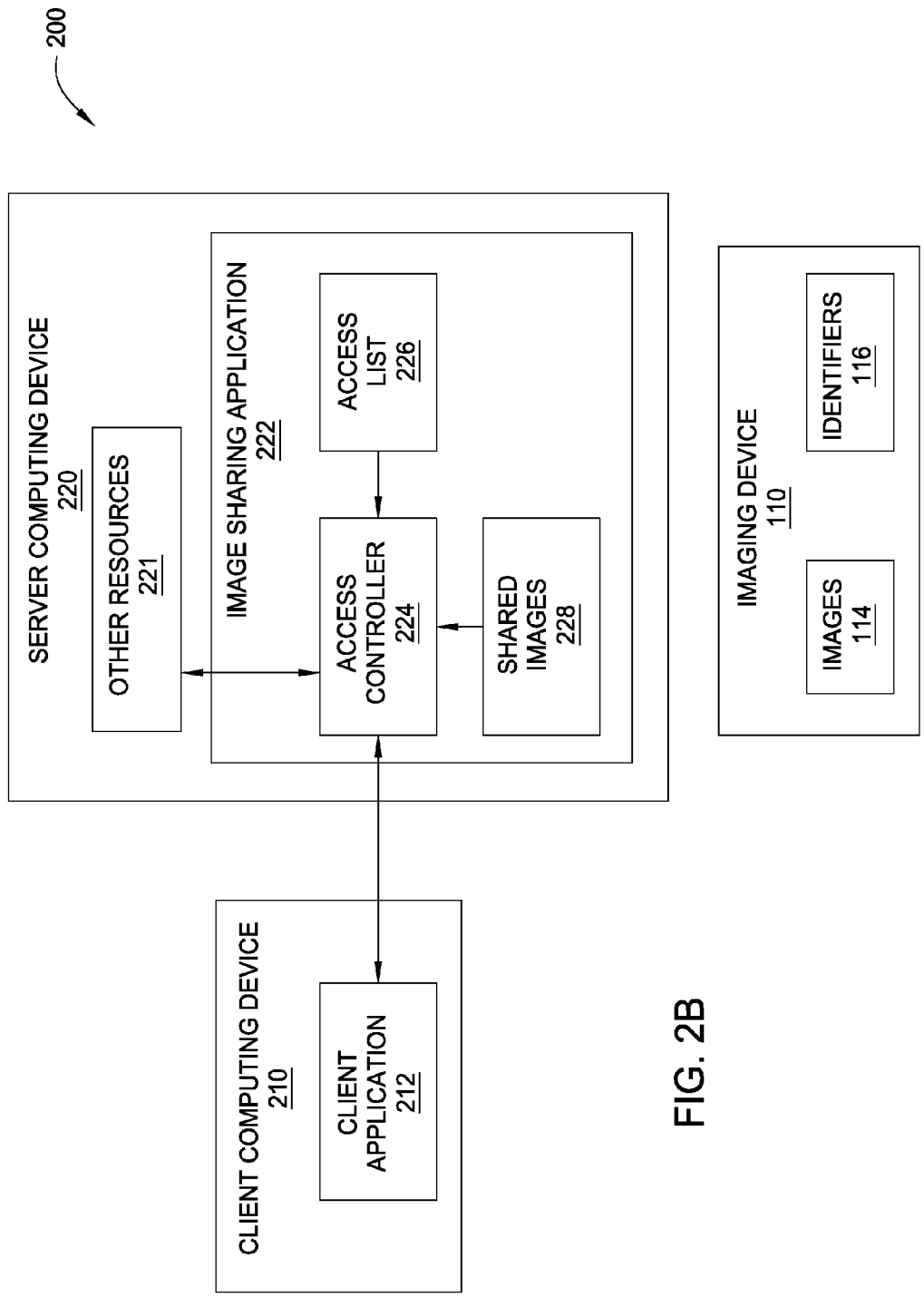

FIGS. 2A-2B illustrate a block diagram of a computing system 200 for controlling access to digital images, according to one embodiment of the invention. The computing system 200 includes a client computing device 210, a server computing device 220, and the imaging device 110 illustrated in FIG. 1. The client computing device 210 includes a client application 212 (e.g., a web browser). It is contemplated that the client computing device 210 may be one of the wireless devices 120, according to one embodiment. The server computing device 220 includes an image sharing application 222 (e.g., a web application) and other resources 221. The image sharing application 222 includes an access controller 224, an access list 226, and a set of shared images 228. The other resources 221 represent any server applications (other than the image sharing application 222) that may be made available to a user of a client computing device 210, for example image editing applications, communications applications, word processing applications, etc.

As shown in FIG. 2A, the set of identifiers 116 and the set of images 114 are uploaded from the imaging device 110 to the image sharing application 222. The uploaded images 114 are added to the set of shared images 228, and the uploaded identifiers 116 are added to the access list 226. The persons included in the access list 226 may be notified of the location of the shared images 228. In the case where the identifiers 116 include email addresses, the notifications may be emails generated by the image sharing application 222. The notification may include the network address of the image sharing application 222 (e.g., web address) and the password assigned to the notified user.

For the sake of simplicity, FIG. 2A illustrates the identifiers 116 and the set of images 114 as being separate objects stored within the imaging device 110. However, in one embodiment, each image 114 may include the corresponding identifiers 116. More specifically, each image 114 may be a data object that includes metadata storing the identifiers 116 for the users who may access that particular image 114. Once an image 114 is uploaded to the image sharing application 222, the identifiers 116 may be extracted from the metadata included in the image 114.

FIG. 2B illustrates the computing system 200 in the event that a user is using the client application 212 to connect to the image sharing application 222 in order to view the shared images 228. In one embodiment, the user is asked for his identifier (i.e., email address) and password. The access controller 224 determines if the user attempting a connection is a valid member of the access list 226, and if he has provided a valid password. The password may have been provided to the user in the invitation signal 160 sent by the imaging device 110, as noted above. If the user provides a valid identifier and password, he is allowed to view a shared image 228 corresponding to his identifier. It also contemplated that the user may be allowed to view a sub-set or the entire set of shared images 228, or to gain access to other resources 221 on the server computing device 220. Of course, the example described above with reference to FIGS. 2A and 2B is for illustrative purposes only, and is not intended to limit the scope of the invention. It is contemplated that embodiments of the invention may not include all of the elements described above. For example, in other embodiments, the user may be asked to provide either an identifier or a password, or may be identified by some other means (e.g., a cookie, IP address, etc.).

Figure 3:
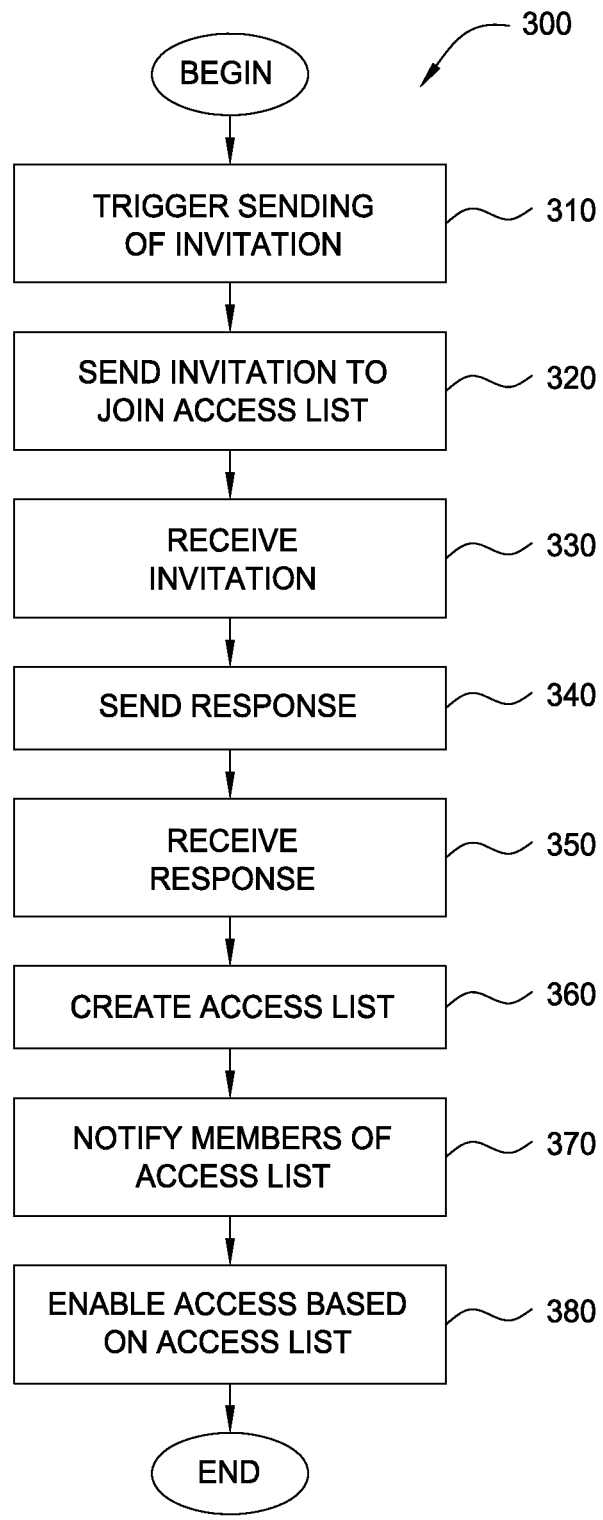
FIG. 3 is a flow diagram illustrating a method for controlling access to a digital images based on camera proximity, according to one embodiment of the invention.

FIG. 3 is a flow diagram illustrating a method 300 for controlling access to a digital images based on device proximity, according to one embodiment of the invention. The method 300 is described with respect to portable wireless devices, where at least one of the devices is capable of capturing a digital image (e.g., imaging device 110). The method 300 begins at step 310, by triggering the sending of an invitation. The triggering of the invitation can occur automatically (e.g., when imaging device 110 captures an image), or can be occur manually (e.g., by a user activation of a control). At step 320, the invitation to join an access list is sent by a first wireless device. In one embodiment, the first wireless device is capable of capturing a digital image (e.g., imaging device 110). The invitation may be a short-range wireless transmission (e.g., invitation signal 160), or may be a cellular message sent to devices in the same vicinity (e.g., cellular invitation message 180), according to one embodiment. Alternatively, the invitation may be performed by some other technique. It is contemplated that the invitation may be broadcast indiscriminately, or transmitted only to selected devices (which may or may not be in the vicinity). In the latter case, the selected devices may be identified according to an invitation list resident on, or accessible by, the first wireless device.

At step 330, the invitation is received by a second wireless device in the same vicinity as the first wireless device (e.g., wireless device 120). At step 340, a response is sent from the second wireless device. The response can be sent by a manual command from the user of the second device, or can be sent automatically according to rules programmed in the second device. The response may be a short-range wireless transmission (e.g., wireless signal 170), or may be a cellular message (e.g., cellular signal 185), according to one embodiment. At step 350, the first wireless device receives the response sent by the second wireless device. The response contains an identifier that uniquely identifies the owner of the second device, such as an email address. At step 360, the responses received by the first wireless device are used to generate an access list (e.g., access list 226). The access list may be generated by the first wireless device, or may be generated by an external application (e.g., image sharing application 222). In one embodiment, all wireless devices responding to the request are placed on the access list. In another embodiment, a master access list (e.g., buddy list) is predefined as the list of approved devices that may accept an invitation issued by the first wireless device. The access list generated at step 360 then includes only a subset of the devices contained on the master access list. At step 370, the generated access list is used to notify the people in the list. The notification may be an email sent by an external application (e.g., image sharing application 222), according to one embodiment. The notification may include the location of the digital image files (e.g., a web link to a hosting web site), and any other information required to access the images, such as passwords, instructions, etc. At step 380, the access list is used to enable access to the digital images for those people identified on the access list. That is, any user attempting to access the digital images is first verified against the access list.

In the above examples, embodiments of the invention are described in terms of digital images. However, these descriptions are for illustrative purposes only, and in no way limit the scope of the invention. It is contemplated that embodiments of the invention may comprise other forms of content, for example audio recordings. Thus, more generally embodiments of the present invention are directed to any digital media including images, video, and audio content.

While the foregoing is directed to embodiments of the present invention, other and further embodiments of the invention may be devised without departing from the basic scope thereof, and the scope thereof is determined by the claims that follow.

What is claimed is:

1. A method for generating an access list for controlling access to an image, the method comprising:

in response to capturing the image on an image capture device, broadcasting a wireless invitation signal from the image capture device prior to identifying any device within range of the wireless invitation signal;

receiving at least one response signal from at least one responding device indicating receipt of the wireless invitation signal, wherein the at least one response signal includes at least one respective identifier corresponding to the at least one responding device, wherein the at least one responding device is configured to automatically generate the at least one response signal based on a classification of the image, and wherein the response signal indicates an acceptance of an invitation specified in the wireless invitation signal to be included on an access list corresponding to the image; and in response to receiving the at least one response signal, generating the access list, wherein the access list is composed according to the at least one respective identifier included in the at least one response signal.

2. The method of claim 1, further comprising controlling access to the image based on the access list.

3. The method of claim 2, wherein the image is stored in a network location, and wherein access to the image is provided by a web application.

4. The method of claim 1, wherein the wireless invitation signal is a Bluetooth signal detectable only by devices in a transmission vicinity of the image capture device.

5. The method of claim 1, wherein a respective identifier is an email address of an owner of the respective responding device.

6. The method of claim 5, wherein the identifier is used to generate an email notification to the owner of the responding device, and wherein the email notification includes a location of the image.

7. The method of claim 1, further comprising transferring the image and the access list to an image sharing server.

8. The method of claim 1, further comprising transferring the image and the access list to an image sharing server configured to send an electronic notification associated with each identifier on the access list.

9. The method of claim 1, wherein generating the access list comprises including a respective identifier on the access list only if the respective responding device is contained on a predefined list of approved devices accessible to the image capture device.

10. The method of claim 1, wherein the access list is stored as metadata embedded in the image.

11. The method of claim 1, further comprising controlling access to resources other than the image based on the access list.

12. A computer readable storage medium containing a program, which, when executed, performs an operation comprising:

in response to capturing an image on an image capture device, broadcasting a wireless invitation signal from the image capture device prior to identifying any device within range of the wireless invitation signal;

receiving at least one response signal from at least one responding device indicating receipt of the wireless invitation signal, wherein the at least one response signal includes at least one respective identifier corresponding to the at least one responding device, wherein the at least one responding device is configured to automatically generate the at least one response signal based on a classification of the image, and wherein the response signal indicates an acceptance of an invitation specified in the wireless invitation signal to be included in an access list corresponding to the image; and in response to receiving the at least one response signal, generating the access list, wherein the access list is composed according to the at least one respective identifier included in the at least one response signal.

13. The computer readable storage medium of claim 12, further comprising controlling access to the image based on the access list.

14. The computer readable storage medium of claim 13, wherein the image is stored in a network location, and wherein access to the image is provided by a web application.

15. The computer readable storage medium of claim 12, wherein the wireless invitation signal is a Bluetooth signal detectable only by devices in a transmission vicinity of the image capture device.

16. The computer readable storage medium of claim 12, wherein a respective identifier is an email address of an owner of the respective responding device.

17. The computer readable storage medium of claim 12, wherein the identifier is used to generate an email notification to the owner of the responding device, and wherein the email notification includes a location of the image.

18. The computer readable storage medium of claim 12, further comprising transferring the image and the access list to an image sharing server.

19. The computer readable storage medium of claim 12, further comprising transferring the image and the access list to an image sharing server configured to send an electronic notification associated with each identifier on the access list.

20. The computer readable storage medium of claim 12, wherein generating the access list comprises including a respective identifier on the access list only if the respective responding device is contained on a predefined list of approved devices accessible to the image capture device.

21. The computer readable storage medium of claim 12, wherein the access list is stored as metadata embedded in the image.

22. The computer readable storage medium of claim 12, further comprising controlling access to resources other than the image based on the access list.

23. A system comprising:

an image capture device comprising circuitry configured to:

in response to capturing an image, broadcast a wireless invitation signal prior to identifying any device within range of the wireless invitation signal;

receive at least one response signal from at least one responding device indicating receipt of the wireless invitation signal, wherein the at least one response signal includes at least one respective identifier corresponding to the at least one responding device, wherein the at least one responding device is configured to automatically generate the at least one response signal based on a classification of the image, and wherein the response signal indicates an acceptance of an invitation specified in the wireless invitation signal to be included in an access list corresponding to the image;

in response to receiving the at least one response signal, generate the access list, wherein the access list is composed according to the at least one respective identifier included in the at least one response signal; and provide the access list to a computing device configured to control access to the image based on the access list.

24. The system of claim 23, wherein the image is stored in a network location, and wherein access to the image is provided by a web application.

25. The system of claim 23, wherein the wireless invitation signal is a Bluetooth signal detectable only by devices in a transmission vicinity of the image capture device.

26. The system of claim 23, wherein a respective identifier is an email address of an owner of the respective responding device.

27. The system of claim 23, wherein the identifier is used to generate an email notification to the owner of the responding device, and wherein the email notification includes a location of the image.

28. The system of claim 23, wherein the computing device is an image sharing server configured to receive the image from the image capture device.

29. The system of claim 23, wherein the computing device is an image sharing server configured to receive the image and the access list from the image capture device, and further configured to send an electronic notification associated with each identifier on the access list.

30. The system of claim 23, wherein generating the access list comprises including a respective identifier on the access list only if the respective responding device is contained on a predefined list of approved devices accessible to the image capture device.

31. The system of claim 23, wherein the access list is stored as metadata embedded in the image.

32. The system of claim 23, wherein the access list configures the computing device to control access to resources other than the image.

33. A method for generating an access list for controlling access to an image, the method comprising:

in response to capturing the image on an image capture device, classifying the image using a profile, determining at least one selected device based on the profile, and sending a wireless invitation signal from the image capture device to the at least one selected device, wherein the wireless invitation signal indicates the classification of the image;

receiving at least one response signal from at least one responding device indicating receipt of the wireless invitation signal, wherein the at least one response signal includes at least one respective identifier corresponding to the at least one responding device, wherein the at least one responding device is configured to automatically generate the at least one response signal based on the classification of the image, and wherein the response signal indicates an acceptance of an invitation specified in the wireless invitation signal to be included on the access list; and generating an access list corresponding to the image, wherein the access list is composed according to the at least one respective identifier included in the at least one response signal.

34. The method of claim 33, wherein the profile is defined based on at least one of friendship, family, and scenery.

* * * * *